United States Statutory Invention Registration [19]

[11] Reg. Number: H999

Merkel et al. [43] Published: Dec. 3, 1991

[54] TRANSPARENCY DISTORTION MEASUREMENT PROCESS

[75] Inventors: Harold S. Merkel, Beavercreek; Harry L. Task, Dayton, both of Ohio

[73] Assignee: The United States of America as represented by the Secretary of the Air Force, Washington, D.C.

[21] Appl. No.: 582,463

[22] Filed: Sep. 13, 1990

[51] Int. Cl.[5] ..... G01N 21/17

[52] U.S. Cl. ..... 356/239; 358/106; 364/507; 364/552; 382/8; 250/563; 250/572

[58] Field of Search ..... 356/239, 384, 387; 250/563, 572; 358/106; 364/525, 507, 552; 382/1, 8, 16, 18

[56] References Cited

U.S. PATENT DOCUMENTS

| | | | |
|---|---|---|---|
| 2,871,756 | 2/1959 | Graves et al. | 356/239 |
| 3,877,814 | 4/1975 | Hess et al. | 356/120 |
| 4,310,242 | 1/1982 | Genco | 356/239 |
| 4,453,827 | 6/1984 | Taboada | 356/353 |
| 4,461,570 | 7/1984 | Task et al. | 356/239 |
| 4,647,197 | 3/1987 | Kitaya et al. | 356/239 |
| 4,776,692 | 10/1988 | Kalawsky | 356/239 |

*Primary Examiner*—Bernarr E. Gregory
*Attorney, Agent, or Firm*—Bobby D. Scearce

[57] ABSTRACT

A method for measuring optical distortion in a transparency is described which comprises the steps of acquiring an analog image of a grid board through the transparency, digitizing the analog image to form a digitized image comprising a multiplicity of pixels defining the shape of the grid board as viewed through the transparency, locating on the digitized image the pixels defining the grid and determining optical distortion of the transparency by comparing the shape of the grid in the digitized image to the actual grid shape on the grid board.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TRANSPARENCY DISTORTION MEASUREMENT PROCESS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to apparatus and methods for measuring optical distortion in transparent parts, and more particularly for measuring distortion in transparencies through which visual tasks are performed.

Optical distortion is one of several factors used to assess the quality of transparencies, such as aircraft transparencies, automobile windshields and helmet visors. The amount of optical distortion in a transparency is commonly determined using one of three measurements, viz., displacement grade, lens factor or grid line slope. Each measurement is performed on an image viewed through the transparency of a one inch grid board, is normally of a very small distance, and requires a significant amount of judgment. The subjective nature of the measurements therefore often results in different operators obtaining different distortion values for the same transparency (see, e.g., Kama, "Measures of Distortion: Are They Relevant?", Conference on Aerospace Transparent Materials and Enclosures, Vol II, S. A. Marolo, Ed, Rept #WRDC-TR-89-4044 (April 1989).

The invention solves or substantially reduces in critical importance problems with existing optical distortion measuring methods as just suggested by providing an accurate, reliable and automated distortion measuring method utilizing digital imaging. The invention utilizes a video camera and a frame grabber installed in a microcomputer to digitize images of a grid board. The frame grabber digitizes the analog signal from the video camera and relevant information from the image is condensed into an array containing information on the separation, location and shape of each grid line.

It is therefore a principal object of the invention to provide a method for measuring optical distortion in a transparency.

It is a further object of the invention to provide an optical distortion measuring method which is substantially free of operator error.

These and other objects of the invention will become apparent as a detailed description of representative embodiments proceeds.

SUMMARY OF THE INVENTION

In accordance with the foregoing principles and objects of the invention, a method for measuring optical distortion in a transparency is described which comprises the steps of acquiring an analog image of a grid board through the transparency, digitizing the analog image to form a digitized image comprising a multiplicity of pixels defining the shape of the grid board as viewed through the transparency, locating on the digitized image the pixels defining the grid and determining optical distortion of the transparency by comparing the shape of the grid in the digitized image to the actual grid shape on the grid board.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
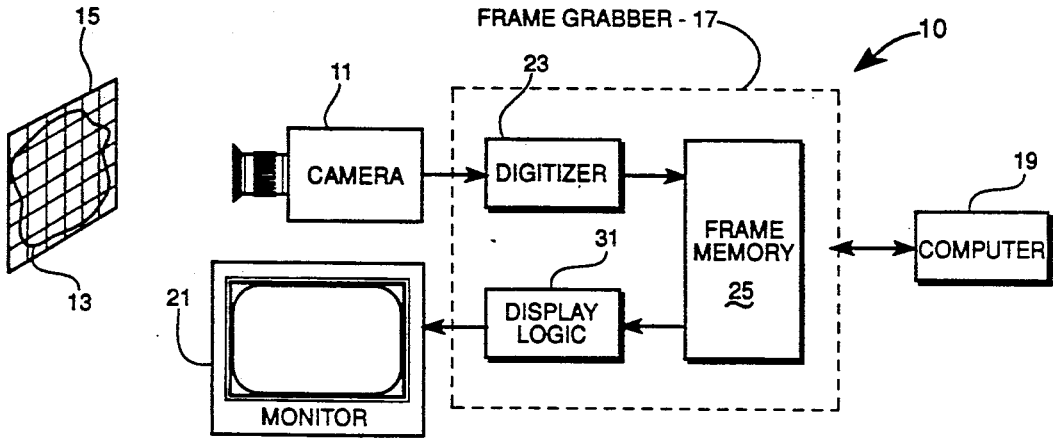
FIG. 1 is a block diagram of components of a representative system for practicing the method of the invention.
Figure 2:
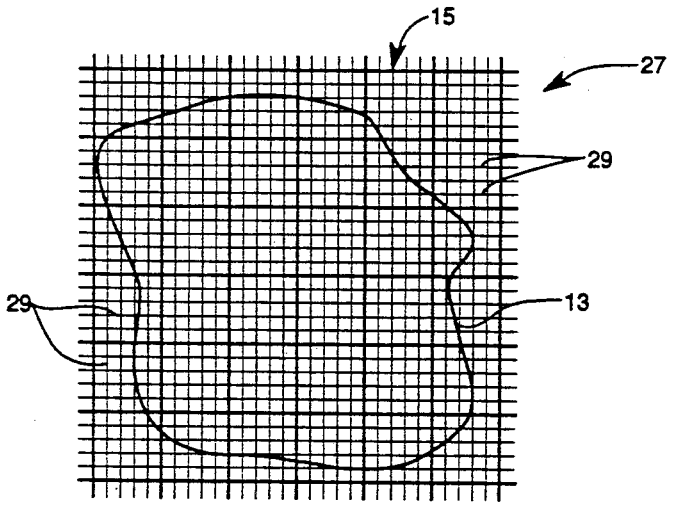
FIG. 2 is a drawing of an image on a grid for illustrating the method of the invention.

Referring now to FIG. 1, shown therein is a block diagram of components of a representative system 10 for performing optical distortion measurements according to the invention. System 10 includes camera 11 (video, photographic or other suitable imaging device) for acquiring an analog image of grid 15 through transparency 13. Images from camera 11 are fed into frame grabber 17 operatively connected to computer 19 and monitor 21. Frame grabber 17 typically comprises a single board plugged into an expansion slot of computer 19 and may be controlled with software programs executable on computer 19. Frame grabber 17 digitizes the incoming analog signal from camera 11 utilizing digitizer 23 and stores the resulting pixels in frame memory 25. FIG. 2 illustrates a representative image 27 of transparency 13 and grid 15 produced by camera 11. Each pixel 29 of image 27 has one of several possible gray shades depending on the specific frame grabber used. An eight-bit frame grabber, for example, can convert the analog signal into one of 256 possible gray shades, usually at a rate of 30 frames per second. Frame grabber 17 may generally include display logic 31 for converting the digital image in frame memory 25 back to analog format for display on monitor 21. It is noted that other means for digitizing image 27 may be used as would occur to the skilled artisan guided by these teachings, the specific digitizing means not considered limiting of the invention. Video camera 11 and frame grabber 17 may be preferable as offering flexibility of digitizing from a video image of grid 15 or from a photograph.

Optical distortion in transparency 13 according to the invention may be made by measuring any one of grid line slope, lens factor or displacement grade, the procedures for each differing only in the latter stages of the method. An important aspect of the invention, therefore, is the conversion of the digitized grid image 27 into a format which can be used to determine distortion parameters by converting an array containing pixel location and intensity information to an array quantifying the shape of multiple grid lines of grid 15.

In practicing the invention by taking measurements of grid line slope, camera 11 is first positioned and adjusted for acquiring the desired image 27 of transparency 13 and grid 15. System 10 then substantially automatically performs image acquisition and distortion analysis under computer 19 control. A representative computer program for operating system 10 in accordance with the governing principles of the invention is presented below in APPENDIX A. A first determination to be made is whether or not a real time video image is to be acquired; if yes, frame grabber 17 displays a real time image on monitor 21 and instructions to position and focus camera 11 are displayed. Once camera 11 is properly positioned, the acquired image may be saved into frame memory 25.

After the desired image 27 is in frame memory 25, one of the left or right side of image 27 is selected for search for horizontal grid lines. In the representative program presented in APPENDIX A, the left side of displayed image 27 is searched, so that if the right side of image 27 is selected for search, image 27 is reflected about a central vertical axis, i.e., the image is left-right reversed. This left/right choice is included because the program searches vertically down the left side of image 27 for grid lines, and a curved edge on the left side would cause some of the grid lines to be omitted. By reversing image 27 left to right, it can be ensured that the left side thereof has a straight vertical edge rather than a curved edge, which is often caused by the frame structure supporting transparency 13.

Next the program queries the pixel number to use in searching for lines in grid 15. This is the number of pixels from the left edge of image 27 at which the search is conducted. It is preferable to search 5 to 15 pixels in from the edge to avoid omitting lines which have the end one to two pixels turned off.

If horizontal edge enhancement is desired, the entire image 27 is convolved with the 3×5 matrix:

| | | | | |
|---|---|---|---|---|
| 1 | 1 | 1 | 1 | 1 |
| 0 | 0 | 0 | 0 | 0 |
| −1 | −1 | −1 | −1 | −1 |

This operation detects and enhances horizontal edges of image 27 and removes vertical edges. After edge enhancement is complete, the outer two pixels on the perimeter of image 27 are turned off; these are usually turned on by the edge detection routine.

A threshold value is then applied to image 27. Each pixel 29 has a luminance value 0 to 255. By applying a threshold value between 0 and 255 to image 27, pixels having luminance at or above the threshold value may be assigned a value of 255 (ON), while pixels below the threshold may be assigned a value of 0 (OFF). The threshold value may be changed until the best image is obtained, that is, at which all horizontal grid line pixels are ON and all background pixels are OFF (or grid pixels OFF and background pixels ON). The resulting binary image is then mapped into frame memory 25 and the horizontal grid lines, which may be several pixels thick, are thinned to a single pixel. Starting in the upper left corner of the image, the left edge of image 27 is searched for ON pixels, which indicate the presence of a grid line. After a grid line is found at a particular y coordinate, image 27 is searched from left to right to locate and save into memory the coordinates of the ON pixels which comprise the grid line. After the line has been completed, the search down the left edge is resumed until the next grid line is found. The search is repeated until the bottom of image 27 is reached.

The analog grid image is therefore converted into digital format and all relevant information from image 27 is condensed into an array containing information on separation, location and shape of each grid line. This array can be used to calculate any of several grid parameters, such as lens factor or displacement grade. To measure grid line slope, the difference is calculated in the y coordinates of two pixels spaced 30 pixels apart on the same grid line. This calculation is performed 482 times for each grid line, starting with pixels 0 to 30 and ending with pixels 481 and 511. For example, if pixel 42 has a y coordinate of 56 and pixel 12 has a y coordinate of 53 (a difference of 3), a grid line slope value of 1:10 would be assigned to the line at pixel number 27, since the line changed vertically 3 units over a horizontal distance of 30 units, centered about pixel 27. As this calculation is performed for each line of the image, the number of occurrences of each grid line slope value is tallied in a separate array. When grid line slope has been calculated for the entire image, a histogram of slope values is computed and saved along with other relevant parameters of the image. The histogram yields a description of the grid line slope values as a percentage of the transparency. For example, TABLE I shows a histogram file for automated grid line slope measurement of an aircraft windscreen section: 42% of the image has a grid line slope value of 1:30, 20% has a slope of 1:15, etc.

Lens factor and displacement grade may be calculated from images 27 of grid 15 which contain a portion of grid 15 acquired through transparency 13 and a portion acquired directly (i.e., not through transparency 13). These images may be produced by positioning camera 11 so that part of grid 15 is viewed through transparency 13 (measurement area) and part of grid 15 is viewed around the edge(s) of transparency 13 (reference area).

To calculate lens factor, a cursor is positioned on image 27 in the reference area of grid 15 (via the keyboard or a mouse). A line search algorithm is then initiated to determine the pixel location of the eight nearest lines in both the horizontal and vertical directions (left, right, up and down). The computer then uses the pixel locations of the eighth line from the cursor to calculate the average line separation in both the horizontal and vertical directions. For example if the cursor is positioned at pixel location (225, 358) and the line search algorithm determines the position of the eighth line to the left is at (163,358) and the position of the eighth line to the right is at (278,358), then the average separation of the vertical lines is (278—163)/15=115/15=7.67 pixels per line (the divisor is 15 because there are 15 intervals between the 16 lines found by the search). An identical process is carried out for the vertical direction. The cursor is then positioned in the measurement area of image 27 and the process just described is repeated. The values from the two areas are compared and the larger result is divided by the smaller, and the quotient is cubed to calculate the lens factor.

The specific procedure for computing displacement grade is dependent upon the type of transparency being analyzed. In general, the displacement, or pixel range, of a line is measured for both vertical and horizontal lines in several specified areas (zones) of transparency 13. The maximum horizontal displacement occurring in a particular zone is added to the maximum vertical displacement occurring in the same zone, and the total is multiplied by 1000 to yield the displacement grade value for that zone. Measurements are reported in units of 0.001 inch, so a scale factor is computed for each image which relates pixel size to the linear scale of grid 15.

The invention therefore provides a method for measuring optical distortion in a transparency. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

TABLE I

| line | 0 | 1:30 | 1:15 | 1:10 | 1:7.5 | 1:6 | 1:5 | 1:4.3 |
|---|---|---|---|---|---|---|---|---|
| 1 | 159 | 255 | 68 | 0 | 0 | 0 | 0 | 0 |
| 2 | 186 | 222 | 74 | 0 | 0 | 0 | 0 | 0 |
| 3 | 156 | 251 | 75 | 0 | 0 | 0 | 0 | 0 |
| 4 | 97 | 265 | 118 | 2 | 0 | 0 | 0 | 0 |
| 5 | 83 | 300 | 96 | 3 | 0 | 0 | 0 | 0 |
| 6 | 94 | 277 | 105 | 6 | 0 | 0 | 0 | 0 |
| 7 | 116 | 256 | 110 | 0 | 0 | 0 | 0 | 0 |
| 8 | 129 | 203 | 149 | 1 | 0 | 0 | 0 | 0 |
| 9 | 79 | 224 | 174 | 5 | 0 | 0 | 0 | 0 |
| 10 | 125 | 181 | 151 | 25 | 0 | 0 | 0 | 0 |
| 11 | 131 | 213 | 90 | 45 | 3 | 0 | 0 | 0 |
| 12 | 110 | 225 | 106 | 31 | 10 | 0 | 0 | 0 |
| 13 | 90 | 203 | 136 | 37 | 16 | 0 | 0 | 0 |
| 14 | 72 | 178 | 98 | 112 | 22 | 0 | 0 | 0 |
| 15 | 78 | 171 | 66 | 76 | 62 | 26 | 3 | 0 |
| 16 | 44 | 212 | 51 | 40 | 55 | 64 | 16 | 0 |
| 17 | 83 | 150 | 57 | 28 | 101 | 56 | 7 | 0 |
| 18 | 158 | 120 | 34 | 66 | 66 | 31 | 7 | 0 |
| 19 | 150 | 143 | 80 | 57 | 17 | 27 | 8 | 0 |
| 20 | 198 | 132 | 90 | 20 | 17 | 18 | 7 | 0 |
| 21 | 272 | 95 | 55 | 27 | 27 | 6 | 0 | 0 |
| total | 2610 | 4276 | 1983 | 581 | 396 | 228 | 48 | 0 |
| % | 26 | 42 | 20 | 6 | 4 | 2 | 0 | 0 |

APPENDIX A

```
/*********************************************************************/
#include "c:\pcplus\itex\lib\itexpfg.h"
#include "c:\pcplus\itex\lib\stdtyp.h"
#include "c:\c86\stdio.h"
#include "c:\c86\fileio.h"
#include "c:\c86\string.h"
#include "c:\c86\limits.h"
#define ON 255
#define OFF 0
#define WIDTH 15
#define MAXLINES 28
/*********************************************************************/

        int gridline[512][MAXLINES];    /* declare global array */


main()
        {

        FILE *fi;
        extern FILE *fopen();

        int slope[512][MAXLINES],tally[MAXLINES][10],date[4],xs,min,max,range,
                errstat,year,month,day,hour,minutes,go,thresh,count,temp,i=0,
                j,k,n,x,y, l=0,find();
        extern int itoa(),fflush(),ferror(),fclose(),abs();

        char name[30],comment[200],imgname[30],hstname[30],
                 comline[80],line[7],response,resp,res,*w;
        extern char *strcat();

        float total[10],percent[10],W;

        W=WIDTH*1.0;
/*********************************************************************/
/*  Set screen graphics colors                                       */
/*********************************************************************/

printf("\033[44m"); /* blue background */
printf("\033[37m"); /* white foreground */

/*********************************************************************/
/*      Tell the software that hardsare registers are at 300 (hex),     */
/*      memory is at A0000 and configured as two 512 by 512 image areas */
/*********************************************************************/
```

```
        sethdw(0x300,0xA0000,DUAL);
        setdim(512,512,8);                          /*set board dims*/
        fgon();                                                /*turn on board */
/*********************************************************************/
/*                    Initialize all registers and look-up tables     */
/*********************************************************************/
        initialize();
        setvmask(0);
/*********************************************************************/
/*      Query the user whether to acquire real-time video or use an     */
/*      image that is stored on disk.                                   */
/*********************************************************************/
        printf("\033[2J");                          /* clear the screen    */
        query:  printf("Acquire real-time video image? [Y/N]\n");
        response = key_getc();
        if((response == 'Y') || (response == 'y'))
        {
/*********************************************************************/
/*                              Acquire real-time video image           */
/*********************************************************************/
        grab(0);                            /*  display realtime video     */
        printf("Position the camera and focus on the desired image.\n");
        pause: printf("Press any key when ready.\n");
        go = key_getc();
        snap(1);
        printf("Enter a title for the image:\n");
        scanf("%s",imgname);
        strcpy(hstname,imgname);
        strcat(imgname,".img");
        strcat(hstname,".hst");

        }
else if ((response=='N') || (response=='n'))
        {
/*********************************************************************/
/*                    restore an image stored on disk                   */
/*********************************************************************/
        printf("Enter name of file to restore:\n");
        printf("\033[31m"); /* set red foreground */
        scanf("%s",imgname);
        printf("\033[37m"); /* set white foreground */
        strcpy(hstname,imgname);
        strcat(imgname,".img");
        strcat(hstname,".hst");
        readim(0,0,512,512,imgname,comment);
        }
else
        {
        goto query;
        }
printf("Comment line:\n");
        printf("\033[31m"); /* set red foreground */
while((comline[i] = key_getc()) != '\r')
        {
        putchar(comline[i]);
        i++;
        }
        printf("\n");
        printf("\033[37m"); /* set white foreground */
        saveim(0,0,512,512,0,imgname,comline);
/*********************************************************************/
/*              Reflect around vertical axis?                           */
/*********************************************************************/
quer: printf("Search for lines on the left or right side? [L/R]\n");
        resp = key_getc();
        if((resp == 'R') || (resp == 'r'))
                mirrory(0,0,512,512);
        else if((resp == 'L') || (resp == 'l'))
                printf("");
        else
                goto quer;
/*********************************************************************/
/*                      Query for value of xs                           */
/*********************************************************************/
```

```
printf("Number of pixels from edge at which to search for grid lines:");
printf("\033[31m"); /* set red foreground */
scanf("%d",&xs);
printf("\033[37m"); /* set white foreground */
/* printf("xs=%d\n",xs); */
/*********************************************************************/
/*                        Horizontal edge enhancement?                 */
/*********************************************************************/
que: printf("Enhance horizontal edges? [Y/N]\n");
res = key_getc();
        if((res == 'Y') || (res == 'y'))
                {
                enhoriz(0,0,512,512,3);
                for(x=0;x<=511;x++)
                        {
                        wpixel(x,0,0);
                        wpixel(x,1,0);
                        wpixel(0,x,0);
                        wpixel(1,x,0);
                        wpixel(2,x,0);
                        wpixel(510,x,0);
                        wpixel(511,x,0);
                        wpixel(x,510,0);
                        wpixel(x,511,0);
                        }
                }
        else if((res == 'N') || (res == 'n'))
                printf(" ");
        else
                goto que;
/*********************************************************************/
/*              Apply a threshold to the image to create a binary image */
/*********************************************************************/
                setlut(INPUT,0);
                setlut(GREEN,0);
thr:    printf("Enter the threshold value: (0 to continue)\n");
                printf("\033[31m"); /* set red foreground */
                scanf("%d", &thresh);
                printf("\033[37m"); /* set white foreground */
                if(thresh == 0)
                        goto fin;
                else
                        threshold(GREEN,0,255,thresh);
                goto thr;
fin:    maplut(GREEN,0,0,0,512,512);
/*********************************************************************/
        thin();         /* thin the grid lines to a single pixel        */
/*********************************************************************/
/*      Starting at the upper left, search down the image at xs pixels  */
/*      from the edge for ON pixels, which indicate the presence of a   */
/*      grid line.                                                      */
/*********************************************************************/
printf("Finding grid lines...\n");
for(y=1;y<=511;y++)
        {
        if(rpixel(xs,y)==ON)
                {
                l++;                        /* Increment grid line number  */
                itoa(l,line);               /* Convert line # to ASCII     */
                text(10,y,0,1,255,"line");  /* Label the grid lines on the */
                text(45,y,0,1,255,line);    /* monitor.                    */
                k=y;                        /* Assign dummy variable k     */
                for(x=0;x<=511;x++)         /* Determine how the line      */
                        {                   /* changes.                    */
/*********************************************************************/
/*      If the next pixel to the right is ON, the line does not go up   */
/*      or down, so gridline[x][l] = k                                  */
/*********************************************************************/
                                if(rpixel(x,k)==ON)
                                        gridline[x][l]=k;
                                else
/*********************************************************************/
```

```
/*      If the next pixel to the right is not ON, then use the function */
/*      find() which return the distance up (-) or down (+) where the   */
/*      ON pixel is.  If an ON pixel is not located within 10 units up  */
/*      or down, then find() returns a value of 0.                      */
/*********************************************************************/
                                        {
                                        gridline[x][1]=k+find(x,k);
                                        k=k+find(x,k);
                                        }
                        }
                }
        }
/*********************************************************************/
/*              Open the file to write the data to disk                */
/*********************************************************************/
fi = fopen(hstname,"w");
if(!fi)abort("can't open hstname\n");
getdate(date);
year=date[0];
month=date[1] >> 8;
day=date[1] & 0xff;
hour=date[2] >> 8;
minutes = date[2] & 0xff;
fprintf(fi,"file: %s\tdate: %2d/%02d/%4d\ttime: %2d:%02d\n comment:%s\n\n"
,imgname,month,day,year,hour,minutes,comline);
/*********************************************************************/
/*      Calculate point by point the grid line slope                    */
/*********************************************************************/
printf("Calculating grid line slope...\n\n");
        printf("line\t0\t1:%.1f\t1:%.1f\t1:%.1f\t1:%.1f\t1:%.1f\t1:%.1f\t1:
        %.1f\n",2.*W,W,2.*W/3.,W/2.,2.*W/5.,W/3,2.*W/7.);
        fprintf(fi,"line\t0\t1:%.1f\t1:%.1f\t1:%.1f\t1:%.1f\t1:%.1f\t1:
        %.1f\t1:%.1f\n",2.*W,W,2.*W/3.,W/2.,2.*W/5.,W/3.,2.*W/7.);
for(i=1;i<=1;i++)
        {
        for(k=0;k<=10;k++)
                tally[i][k]=0;
        for(j=WIDTH;j<=(511-WIDTH);j++)
                {
                slope[j][i]=abs(gridline[j+WIDTH][i]-gridline[j-WIDTH][i]);
                switch(slope[j][i])  /* count the number of occurrences of */
                        {            /* various slope values               */
                        case 0:
                                tally[i][0]++;
                                break;
                        case 1:
                                tally[i][1]++;
                                break;
                        case 2:
                                tally[i][2]++;
                                break;
                        case 3:
                                tally[i][3]++;
                                break;
                        case 4:
                                tally[i][4]++;
                                break;
                        case 5:
                                tally[i][5]++;
                                break;
                        case 6:
                                tally[i][6]++;
                                break;
                        case 7:
                                tally[i][7]++;
                                break;
                        }
                }
                printf(" %d\t%d\t%d\t%d\t%d\t%d\t%d\t%d\t%d\n",i,tally[i][0],
                tally[i][1],tally[i][2],tally[i][3],tally[i][4],tally[i][5],
                tally[i][6],tally[i][7]);fprintf(fi," %d\t%d\t%d\t%d\t%d\t%d
                \t%d\t%d\t%d\n",i,tally[i][0],tally[i][1],tally[i][2],
                tally[i][3],tally[i][4],tally[i][5],tally[i][6],tally[i][7]);
```

```
        }
        for(j=0;j<=7;j++)
                {
                total[j]=0;
                for(i=1;i<=1;i++)
                        total[j]=total[j]+tally[i][j];
                }
                printf("total\t%1.0f\t%1.0f\t%1.0f\t%1.0f\t%1.0f\t%1.0f\t%1.0
                f\t%1.0f\n",total[0],total[1],total[2],total[3],total[4],
                total[5],total[6],total[7]);
                fprintf(fi,"total\t%1.0f\t%1.0f\t%1.0f\t%1.0f\t%1.0f\t%1.0f\t%
                1.0f\t%1.0f\n",total[0],total[1],total[2],total[3],total[4],
                total[5],total[6],total[7]);
        total[9]=0;
        for(i=0;i<=7;i++)
                total[9]=total[9]+total[i];
        for(i=0;i<=8;i++)
                percent[i]=(total[i]/total[9]);
        printf("percent\t%2.2f\t%2.2f\t%2.2f\t%2.2f\t%2.2f\t%2.2f\t%2.2f\t%2.2f
        \n",percent[0],percent[1],percent[2],percent[3],percent[4],percent[5],
        percent[6],percent[7]);
        fprintf(fi,"percent\t%2.2f\t%2.2f\t%2.2f\t%2.2f\t%2.2f\t%2.2f\t%
        2.2f\t%2.2f\n",percent[0],percent[1],percent[2],percent[3],percent[4],
        percent[5],percent[6],percent[7]);
/*********************************************************************/
fflush(fi);
errstat = ferror(fi);
if(errstat)printf("\nerrors processing file 'linedata'\n");
fclose(fi);
/*********************************************************************/
/*  Return screen graphics colors to normal                          */
/*********************************************************************/

printf("\033[40m"); /* blue background */
printf("\033[37m"); /* white foreground */


}  /* end of main() */
/*********************************************************************/
/*                          OTHER FUNCTIONS                          */
/*********************************************************************/
find(x,k)
int x,k;
{
int n;
        for(n=1;n<=10;n++)
                {
                if(rpixel(x,k-n)==ON)
                        return(-n);
                if(rpixel(x,k+n)==ON)
                        return(n);
                }
        return(0);
}       /* end of find() */
/*********************************************************************/
thin()
{
int x,y,i,s;
for(x=0;x<=511;x++)
        {
        for(y=0;y<=511;y++)
                        if(rpixel(x,y)==ON)
                        {
                        s=10;
                        while(rpixel(x,y+s)==OFF)
                                s--;
                        for(i=0;i<=s;i++)
                                wpixel(x,y+i,OFF);
                        wpixel(x,y+s/2,ON);
                        y=y+11;
                        }
        }
} /* end of thin */
/*********************************************************************/
```

```
getdate(date) /* function to return the system date and time */
int date[4];
{
struct regval { int ax,bx,cx,dx,si,di,ds,es; } srv;
srv.ax = 0x2a00;
sysint21(&srv,&srv);
date[0]=srv.cx;
date[1]=srv.dx;
srv.ax=0x2c00;
sysint21(&srv,&srv);
date[2]=srv.cx;
date[3]=srv.dx;
}                                        /* end of getdate() */
```

We claim:

1. A method for measuring optical distortion in a transparency, comprising the steps of:

(a) providing a grid board having well defined grid lines of preselected spacing thereon;

(b) acquiring an analog image of said grid board through a transparency;

(c) digitizing said analog image to form a digitized image of said grid board and transparency, said digitized image comprising a multiplicity of pixels defining the shape of said grid as viewed through said transparency;

(d) selecting a threshold luminance value for said pixels at or above which threshold luminance value said pixels are assigned an on value and below which threshold luminance value said pixels are assigned an off value;

(e) locating on said digitized image the on and off pixels defining said grid lines; and (f) determining the optical distortion of said transparency by comparing the shape of said grid lines in said digitized image to the shape of said preselected grid lines of said grid board.

2. The method of claim 1 wherein said step of acquiring said image of said grid board through said transparency is performed utilizing a video camera.

3. The method of claim 1 wherein the step of locating on said digitized image the on and off pixels defining said grid lines is performed by searching across said digitized image in a direction generally perpendicular to the direction of said grid lines.

4. The method of claim 1 wherein the step of locating on said digitized image the on and off pixels defining said grid is performed by computer search of the array of said pixels in said digitized image.

5. The method of claim 1 wherein the step of determining the optical distortion of said transparency is performed by comparing the locations of pixels defining corresponding grid lines in said digitized image and said grid board.

6. The method of claim 1 further comprising the step of calculating the slope of each of said grid lines of said digitized image as a percentage of the area of said transparency.

* * * * *